(No Model.)
S. J. ADAMS.
STANCHION.
No. 255,231. Patented Mar. 21, 1882.
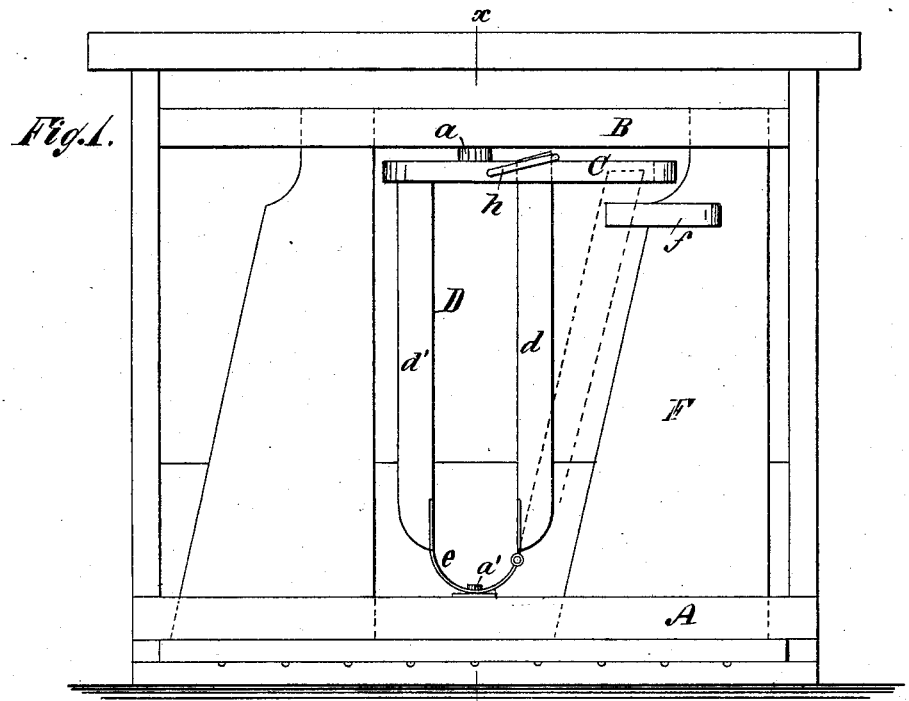
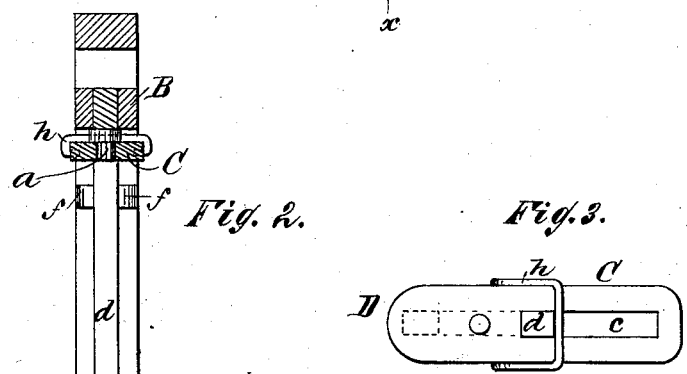
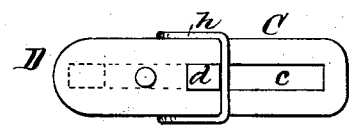
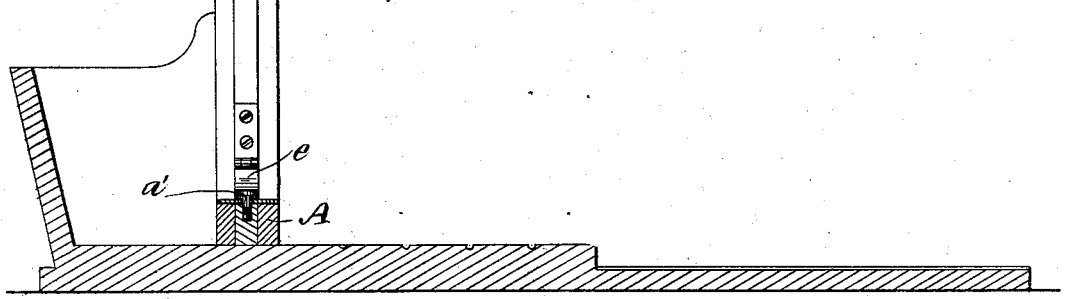
WITNESSES:
Theo. G. Hoster
C. Sedgwick
INVENTOR:
S. J. Adams
BY Munn & Co.
ATTORNEYS.

UNITED STATES PATENT OFFICE.

STEPHEN J. ADAMS, OF WILLETT, NEW YORK.

STANCHION.

SPECIFICATION forming part of Letters Patent No. 255,231, dated March 21, 1882.

Application filed July 30, 1881. (No model.)

*To all whom it may concern:*

Be it known that I, STEPHEN J. ADAMS, of Willett, in the county of Cortland and State of New York, have invented a new and Improved Stanchion, of which the following is a full, clear, and exact specification.

The object of this invention is to furnish an improved stanchion; and to this end the invention consists in the combination, with the slotted and pivoted top plate having an extension, of the movable bars, the hinged and pivoted metal plate, and keeper, all as hereinafter fully described.

In the accompanying drawings, Figure 1 is an elevation of my improved stanchion. Fig. 2 is a sectional elevation of the same, taken on line $x\ x$ of Fig. 1; and Fig. 3 is a top view of the pivoted stanchion, showing the manner of locking the hinged stanchion-bar.

Similar letters of reference indicate corresponding parts.

A represents the lower beam, and B the upper beam, of the stanchion-frame. To and between these beams is pivoted the stanchion D. The stanchion D is preferably formed of the movable stanchion-bar $d$, which is hinged at its lower end to the curved metal plate $e$, and moves at its upper end in the slot $c$, formed through the long arm of the cross-plate C and of the stanchion-bar $d'$, which is secured at its lower end to the metal plate $e$ and at its upper end to the short arm of the plate C.

In the construction shown in the drawings the stanchion is pivoted by means of the stud $a$, secured in the upper beam, B, passing through a suitable hole formed through the plate C, and the pin $a'$ passing through the metal plate $e$. Though this is the preferred plan of pivoting the stanchion, I wish it understood that I do not confine myself to it, as many similar means might be devised for this purpose.

When the stanchion is open, in order to keep the same in proper position for stanchioning the animal again, I provide the upright board F with the slotted keeper $f$, into which the movable stanchion-bar $d$ fits when open, as shown in dotted line in Fig. 1; and in order to lock the stanchion-bar $d$ so as to secure the animal in the stanchion, I provide the plate C with the hinged hook or bale $h$, which drops over the upper end of the said stanchion-bar, which is made to reach a suitable distance above the plate for this purpose.

By this construction of stanchion it will be observed that both bars of the stanchion are free to move with every movement of the neck and shoulders of the animal, thus adding greatly to the ease and comfort of the animal and obviating altogether the injurious cramping and unnatural confinement incident to stanchions of ordinary construction.

Having thus described my invention, I claim as new and desire to secure by Letters Patent—

1. In a cattle-stanchion, the combination, with the slotted top plate, C, having extension and pivoted at $a$, of the bars $d\ d'$, hinged and pivoted metal plate $e$, and keeper $f$, substantially as herein shown and described.

2. The pivoted stanchion D, in combination with the upright F, provided with the keeper $f$, as and for the purposes set forth.

STEPHEN J. ADAMS.

Witnesses:
 DAVID A. WILES,
 O. BURLINGAME.